UNITED STATES PATENT OFFICE

3,342,852
ALKOXYALKYL TERPENYL PHTHALATES
William J. Cunningham, Philadelphia, Pa., assignor to Rohm & Haas Company, Philadelphia, Pa., a corporation of Delaware
No Drawing. Filed Sept. 25, 1964, Ser. No. 398,107
3 Claims. (Cl. 260—475)

This is a continuation-in-part of my U.S. application Serial No. 327,864 which was filed on November 18, 1963, now abandoned.

This invention concerns processes for the preparation of esters of dibasic acids, the esters so produced, and polyvinyl chloride compounds plasticized therewith. More particularly, it concerns esters which are prepared by reacting dibasic acids or the alkyl half esters thereof with terpenes.

It has been found further that the acid form of a sulfonic acid type cation exchanger, which possesses a macroreticular structure as hereinafter defined, is a particularly effective catalyst for the reaction of the terpene with the acid or the half ester of the acid.

The esters of the present invention, and more particularly the mixed alkyl terpene esters of dibasic acids, are highly effective plasticizers for polyvinyl chloride (PVC) and typical formulations and test data thereon are presented hereinafter. These esters, as a class, are characterized by low volatility, i.e., good permanence, good compatibility as indicated by excellent resistance to high humidity spew, and good light stability, and the PVC compositions plasticized therewith are very resistant to staining.

It has been found that the introduction of the terpenyl group into the molecule markedly improves its compatibility with polyvinyl chloride. For instance, didecyl adipate, as the sole plasticizer in a PVC composition, spews excessively; in other words, it is substantially incompatible. However, decylisobornyl adipate, substantially the same molecular weight, is very compatible and shows no spew over prolonged periods of time. Thus, the compounds of the present invention can be used as compatibilizing plasticizers for the so-called "secondary" plasticizers.

The products of the present invention when used as plasticizers for PVC compositions are also characterized by rapid fluxing and/or fluxing at lower temperatures. This characteristic results in easier and faster processing for PVC stocks.

For most laboratory experiments, a three- or four-neck round-bottom flask is equipped with a stirrer, a reflux condenser, and a thermometer. The thermometer is connected to the heating device through a temperature controller so that constant reaction temperatures can be maintained. The carboxylic acid (in many cases the half-ester of dibasic acids), the terpene and the resin catalyst are combined in the flask at room temperature. Camphene, being a low-melting solid, is added in the molten form. The reactants are heated up to and maintained at the desired temperature with continuous stirring. The progress of the addition or esterification reaction is followed through the disappearance of the carboxylic acid functionality. Small aliquots of the reaction mixture are withdrawn periodically, dissolved in ethanol, and titrated with standard ethanolic potassium hydroxide solution. When the conversion to ester levels off, heating is discontinued. The conversion usually shows a small increase as the reaction mixture is allowed to cool. The crude liquid is siphoned out, while the resin catalyst remains in the flask for recycling.

For each mole of carboxylic acid, from one to five moles of terpene is used. An excess of terpene is employed in most reactions, the preferred reactant ratio being 1.75–2.50 moles terpene per mole of acid. Macroreticular sufonic acid resins such as Catalyst XE-230 are used in the concentration ranges of about 20 to 50 grams per mole of carboxylic acid, or 5 to 15 grams per mole of terpene, or 5 to 10% of the weight of expected product. Catalyst XE-205 (described hereinafter) does catalyze some of the terpene reactions, but at much slower rates. One of the examples shows a comparison of the catalytic activities of these two macroreticular resins.

The reaction temperatures range from 25° to 125° C. A particularly preferred range is from 60° C. to 90° C.

The reaction mixtures are worked up with or without aqueous alkaline washing for removal of the small amounts of unreacted acids. Many of the ester products have high molecular weights and high boiling points; therefore, they can usually be isolated by simply stripping the excess terpene.

A large number of dibasic acids can be employed in the processes of the present invention, and typical of them, and among those which are preferred for the preparation of plasticizers for PVC, are adipic acid, phthalic acid (generally used as the anhydride), glutaric acid, sebacic acid, suberic acid, ethyl suberic acid, pimelic acid, azelaic acid, terephthalic acid, isophthalic acid, dimethyl adipic acid, dodecanedioc acid, and mixtures thereof.

In order to control or change the properties of the plasticizers, it is frequently desirable to make a mixed ester, i.e., two different ester groups on the same dibasic acid backbone. These mixed esters are prepared by reacting the dibasic acid with just enough of an alcohol to form the monoester, and subsequently reacting the half ester with a terpene. By making such mixed esters, it is possible to control such properties as compatibility, volatility, and stability to ultraviolet light.

Although it is possible to make diterpene esters by using the process of the present invention, mixed alkyl or alkoxyethyl terpene esters are preferred as plasticizers for PVC. The alkyl group can range from $C_2$ to $C_{18}$, with the particularly preferred range being from $C_4$ to $C_{15}$. It is generally preferred to make the alkyl half ester and use this as the reactant for reaction with the terpene. Typical of the alkyl and alkoxy groups which can be employed are the following: n-propyl, n-butyl, isobutyl, isoamyl, n-hexyl, isohexyl, 2-ethylhexyl, octyl, isooctyl (Oxo process), isodecyl, n-decyl, lauryl, stearyl, and n-butoxy, isobutoxy, n-hexyloxy, isohexyloxy, n-octyloxy, and isooctyloxy.

The products of the present invention may be represented by the general formula

in which:

R is an organic radical,
$R^1$ is selected from the group consisting of alkyl and alkoxyethyl $C_2$ to $C_{18}$, and
$R^2$ is a terpenyl radical.

Obviously, such a formula covers the diterpenyl ester as well as the alkyl or alkoxy terpenyl esters, which are preferred as plasticizers for polymers, particularly PVC. R, an organic radical, contains only carbon and hydrogen, and it is necessary so to designate it as an "organic radical" since it includes aliphatic and aromatic radicals. That this is true is clearly evident from the variety of dibasic acids which are operable in the present invention. The carbon atom content of this organic radical does not exceed 20.

Using the macroreticular resins as catalysts, a wide variety of terpenes can be added to dibasic acids or their half acid esters, typical of such terpenes being limonene, pinene, fenchene, camphene and phellandrene. The turpentines provide an excellent economical source of terpenes, and either gum- or steam-distilled turpentine can be used. The turpentines are not pure terpenes, but the non-terpene portion does not adversely affect the reaction and is removed by distillation along with the excess terpene which is normally employed.

It is imperative that the resin catalyst possess a macroreticular structure since the conventional prior art gel type resins are substantially ineffective. These macroreticular-structured resins are characterized by having a true porosity as compared to the so-called "gel porosity" of the prior art resins. They are made by copolymerizing a monoethylenically unsaturated aromatic hydrocarbon with a cross-linking agent which is a polyethylenically unsaturated monomer in the presence of a liquid which is a solvent for the monomer mixture, but which neither swells nor is imbibed by the copolymer so formed. The resins of this type represent a relatively recent development, but a detailed discussion of them and an actual example of a typical preparation is set forth in U.S. Patent 3,037,052, column 2, lines 28 et seq. As indicated therein, the macroreticular-structured copolymer is subsequently sulfonated by conventional means. It has been found that the specific surface, and hence the catalytic activity, is proportionately increased as the amount of cross-linker employed is increased. The macroreticular-structured styrene-divinylbenzene copolymers employed in the present invention contain from 5% to 50% by weight of divinylbenzene. A particularly preferred range is from 20% to 50% by weight of divinylbenzene. In the specific working examples given, Catalyst XE–205 is less effective as a catalyst than Catalyst XE–230. This is so because of the lower cross-linking content employed in XE–205. Both of these catalyts are sulfonated styrene-divinylbenzene copolymers and both were dehydrated prior to use, employing the methods set forth in detail in U.S. Patent 3,037,052.

These esters, particularly the alkyl and alkoxyethyl terpene diesters, are, as set forth hereinbefore, very efficient plasticizers for polyvinyl chloride. Four typical formulations involving Plasticizer A, octyl isobornyl phthalate, Plasticizer B, n-butyl isobornyl phthalate, Plasticizer C, n-butoxyethyl isobornyl phthalate, and Plasticizer D, n-hexyloxyethyl isobornyl phthalate are as follows: Plasticizers were incorporated in formulations comprising 60% polyvinyl chloride resin with 40% plasticizer and 1% of a cadmium/barium stabilizer. The results of the tests on these compositions are shown in Table I:

TABLE I*

|  | Plasticizer A | Plasticizer B | Plasticizer C | Plasticizer D |
|---|---|---|---|---|
| Shore "A" Hardness, 10 sec | 78 | 80 | 75 | 81 |
| $T_f=135,000$, °C | −3 | +7 | −8 | −21 |
| A/C Volatility, 24 hrs./90° C | 3.0 | 9.0 | 4.5 | 3.5 |
| 1% Soap Extraction, 24 hrs./90° C | 7.0 | 13.5 | 17.7 | 16.6 |
| n-Hexane Extraction, 2 hrs./RT | 25.0 | 16.5 | 16.9 | 19.6 |
| Atreol No. 9 Extraction 10 days/RT | 4.0 | 0 | 0.7 | 1.9 |
| Quantitative Compatibility | 0 | 0 | 0 | 0.1 |
| Heat Stability, hrs./350° F | ¼–2 | ¼–2 | 1–2 | 1–2 |
| Fadeometer Stability, hrs. to fail | 300 | 400 | 620 | 855 |
| 60° High Humidity Spew | (¹) | (¹) | (¹) | (¹) |

¹ >150 days (dry).
*NOTE.—$T_f$=Modulus of elasticity; A/C=activated carbon; RT=Room temperature.

The formulations shown in the preceding paragraph are standard test formulas frequently employed for screening new products for their plasticizing properties and should not be construed as limiting the ratio of the plasticizers of the present invention to polyvinyl chloride. They may be employed at low levels of the order of 5% to give stocks which are substantially rigid. Even at such low levels of use, processing of the polyvinyl chloride is improved, and some toughness is imparted to the stock. As is apparent from the four examples given, they may be used at appreciably higher levels and, as is well known to those skilled in the art, the plasticizer content is generally determined on the basis of the application for which the stock is intended. Stocks contaniing as high as 60% plasticizer can be used.

The products of the present invention, in addition to being of value as plasticizers for PVC, are also of interest as plasticizers for other polymers. For example, a mixture of Plasticizer A and a poly(methylmethacrylate) with molecular weight in the range 80,000 to 120,000 was prepared by using 70 parts by weight polymer and 30 parts by weight of Plasticizer A which was prepared as a 30% solids solution in toluene-butanol (90/10). Films were flowed out onto glass plates and baked at 200° F. for 30 minutes. Another sample was baked at 300° F. for 30 minutes. Duplicate experimnets were carried out, using Plasticizer B. The results of these tests are as follows:

|  | 200° F. Bake | | 300° F. Bake | |
|---|---|---|---|---|
|  | Plasticizer A | Plasticizer B | Plasticizer A | Plasticizer B |
| Knoop Hardness | 10.5 | 10.4 | 13.7 | 18.0 |

*Example I.—Addition of adipic acid to camphene*

Adipic acid (29.2 grams, 0.2 mole) and camphene (272.5 grams, 2.0 moles) are combined in the presence of the Catalyst XE–230 resin (10.0 grams). The heterogeneous mixture is heated up to and maintained at 100° C. with efficient stirring. The adipic acid is solubilized in about 50 minutes; its conversion to diester reaches 91% within 2 hours and increases to 97% upon cooling of the reaction mixture to room temperature. The mixture is siphoned from the resin catalyst, washed with dilute aqueous sodium hydroxide solution and water, and then distilled under reduced pressure. Diisobornyl adipate boils at 198–203° C. (0.15 mm.); saponification number: calculated 268, found 261. Its structure is confirmed by independent synthesis, nuclear magnetic resonance and infrared absorption spectroscopy.

Adipic acid is also added to α-pinene, gum- and steam-distilled wood turpentines with macroreticular resin catalysis.

*Example II.—Addition of partially esterified adipic acid to α-pinene*

A 4-neck round-bottom flask is equipped with a stirrer, a thermometer, and a distillation assembly which has a graduated receiver and is connected to a vacuum system. The thermometer is connected with the heating device through a Therm-O-Watch controller for constant temperature control. The flask is charged with adipic acid (73.1 grams, 0.50 mole or 1.00 equivalent), mixed n-hexyl, n-octyl and n-decyl alcohols (Conoco Alfol 610), 82.4 grams (0.60 mole), and Catalyst XE–230 resin (15.0 grams). The mixture is heated up to and maintained at 115° C. under a reduced pressure of 270 mm. The calculated amount of water of esterification (10.8 ml., 0.60 mole) is collected in the distillation receiver within 30 minutes. The pressure in the system is further lowered to about 5 mm. for a few minutes to remove traces of water and unreacted alcohols. The partially esterified adipic acid is allowed to cool to about 80° C. and atmospheric pressure is restored. α-Pinene (272.5 grams, 2.00 moles) is now added and the reaction mixture is maintained at 80° C. with stirring. Esterification of the adipic acid reaches 95% in 4 hours and increases to 98% upon cooling the reaction mixture to room temperature. The mixture is siphoned from the resin catalyst, washed at 65° C. with 5% aqueous sodium hydroxide solution and water, and then stripped of unreacted terpenes under reduced pressure to give (hexyl-octyl-decyl) isobornyl adipate, saponification number 256.

Adipic acid is partially esterified with mixed n-octyl and n-decyl alcohols (Rohm & Haas Company Dytols K–57 and K–58) and then added to α-pinene. Partially esterified adipic acid is also added to camphene with macroreticular resin catalysis to give mixed alkyl isobornyl adipates.

Alkyl acid adipates are also prepared by way of polymeric adipic anhydride and then added to terpenes in the presence of Catalyst XE–230.

*Example III.—Addition of alkyl acid phthalates to camphene*

Phthalic anhydride (148.1 grams, 1.0 mole) and mixed n-hexyl, n-octyl and n-decyl alcohols (Conoco Alfol 610), 137.4 grams (1.0 mole), are heated up to 120° C. with stirring over a period of 2 hours to give a quantitative yield of (hexyl-octyl-decyl) acid phthalate.

The acid phthalate (71.5 grams, 0.25 mole) and camphene (102.1 grams, 0.75 mole) are combined in the presence of Catalyst XE–230 (7.5 grams). The mixture is heated up to and maintained at 60° C. with stirring. The conversion to diester reaches 96.0% in 30 minutes and increases to 98.3% upon cooling of the reaction mixture to room temperature. The mixture is separated from the resin catalyst, washed with 5% aqueous sodium hydroxide solution and water, and then stripped of unreacted camphene under reduced pressure to give (hexyl-octyl-decyl) isobornyl phthalate, saponification number 254.

Catalyst XE–205 also catalyzes the addition reaction, but at much slower rates. At an even higher catalyst concentration (12.5 grams of resin with 0.25 mole of acid phthalate and 0.75 mole of camphene as above), the conversion to diester reaches only 32.8% in 30 minutes and 79.8% in 4 hours at 60° C.

A large number of other alkyl or alkoxyethyl acid phthalates are prepared and added to bicyclic monoterpenes with macroreticular resin catalysis. These include the derivatives of the following alcohols: n-butyl, isobutyl, oxo-hexyl, oxo-octyl, mixed heptyl-nonyl (ICI Alphanol 79), mixed octyl-decyl (Conoco Alfol 810 and Rohm & Haas Company Dytol K–57), n-butoxyethyl, isobutoxyethyl, n-hexyloxyethyl, isohexyloxyethyl, n-oxtyloxyethyl, and isooctyloxyethyl.

*Example IV.—Addition of alkyl acid glutarates to camphene*

Glutaric anhydride (114.1 grams, 1.0 mole) and mixed n-decyl alcohols (Rohm & Haas Company Dytol K–58), 145.3 grams, 1.0 mole, are combined and heated at 100° C. with stirring for 1 hour to give a quantitative yield of octyl-decyl acid glutarate.

The acid glutarate (77.8 grams, 0.3 mole), camphene (204.3 grams, 1.5 moles) and Catalyst XE–230 (15.0 grams) are combined, heated to and maintained at 80° C. with stirring. The conversion to diester reaches 93% within 30 minutes and increases to 97% upon cooling of the reaction mixture. The mixture is separated from the resin catalyst and is then washed at 65° C. with 5% aqueous sodium hydroxide solution (75 ml.) and water (two 75 ml. portions). Unreacted camphene is stripped under reduced pressure to give octyl-decyl isobornyl glutarate; saponification number: calculated 284; found 280.

I claim:
1. Esters from the class consisting of n-butoxyethyl isobornyl phthalate and n-hexyloxyethyl isobornyl phthalate.
2. n-Butoxyethyl isobornyl phthalate.
3. n-Hexyloxyethyl isobornyl phthalate.

References Cited

UNITED STATES PATENTS

| | | | |
|---|---|---|---|
| 1,800,862 | 4/1931 | Humphrey | 260—475 |
| 2,312,685 | 3/1943 | Borglin | 260—475 |
| 2,727,013 | 12/1955 | Longley | 260—31.8 |
| 2,862,959 | 12/1958 | Patrick et al. | 260—475 |
| 2,902,510 | 9/1959 | Webb | 260—475 |
| 3,037,052 | 5/1962 | Bortnick | 260—624 |
| 3,076,775 | 2/1963 | Masterson et al. | 260—31.8 |
| 3,172,904 | 3/1965 | Rehfuss | 260—475 |

RICHARD K. JACKSON, *Primary Examiner.*

MORRIS LIEBMAN, *Examiner.*

L. T. JACOBS, T. L. GALLOWAY, *Assistant Examiners.*